(12) United States Patent
Park

(10) Patent No.: US 7,865,135 B2
(45) Date of Patent: Jan. 4, 2011

(54) APPARATUS FOR RECEIVING SATELLITE BROADCASTING AND METHOD THEREOF

(75) Inventor: Kwang Jae Park, Gwangsan-gu (KR)

(73) Assignee: LG Innotek Co., Ltd., Seoul (KR)

(*) Notice: Subject to any disclaimer, the term of this patent is extended or adjusted under 35 U.S.C. 154(b) by 347 days.

(21) Appl. No.: 11/909,849

(22) PCT Filed: Aug. 16, 2006

(86) PCT No.: PCT/KR2006/003205

§ 371 (c)(1),
(2), (4) Date: Sep. 27, 2007

(87) PCT Pub. No.: WO2007/021127

PCT Pub. Date: Feb. 22, 2007

(65) Prior Publication Data

US 2008/0216128 A1    Sep. 4, 2008

(30) Foreign Application Priority Data

Aug. 18, 2005  (KR) .................. 10-2005-0075683

(51) Int. Cl.
*H04H 20/74* (2008.01)

(52) U.S. Cl. ............... 455/3.02; 455/307; 370/350; 725/68

(58) Field of Classification Search ............. 455/3.02; 375/350; 725/68
See application file for complete search history.

(56) References Cited

U.S. PATENT DOCUMENTS

| | | | | |
|---|---|---|---|---|
| 6,836,515 | B1 * | 12/2004 | Kay et al. | 375/260 |
| 6,904,082 | B2 * | 6/2005 | Jones | 375/220 |
| 6,937,670 | B2 * | 8/2005 | Cowley et al. | 375/324 |
| 2002/0075971 | A1 | 6/2002 | Cowley et al. | |
| 2004/0076243 | A1 * | 4/2004 | Ohishi | 375/329 |
| 2004/0166799 | A1 * | 8/2004 | Kral | 455/3.02 |
| 2004/0184565 | A1 * | 9/2004 | Beadle et al. | 375/340 |
| 2004/0203393 | A1 * | 10/2004 | Chen | 455/63.1 |
| 2004/0214548 | A1 * | 10/2004 | Jovenin et al. | 455/302 |

FOREIGN PATENT DOCUMENTS

| | | |
|---|---|---|
| JP | 2002-094399 A | 3/2002 |
| KR | 20-1999-0023263 U | 7/1999 |
| KR | 10-2001-0050760 A | 6/2001 |

* cited by examiner

*Primary Examiner*—Edward Urban
*Assistant Examiner*—Golam Sorowar
(74) *Attorney, Agent, or Firm*—Saliwanchik, Lloyd & Saliwanchik

(57) ABSTRACT

A method for receiving satellite broadcasting includes: amplifying an inputted satellite broadcasting signal; converting the amplified signal to a baseband signal by mixing the amplified signal with a center frequency of a selected channel; and varying a channel bandwidth of the baseband signal.

6 Claims, 3 Drawing Sheets

[Fig. 1]
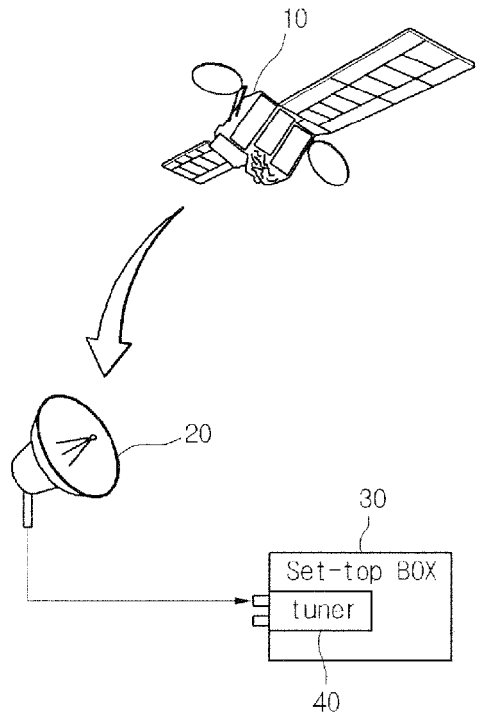
[Fig. 2]
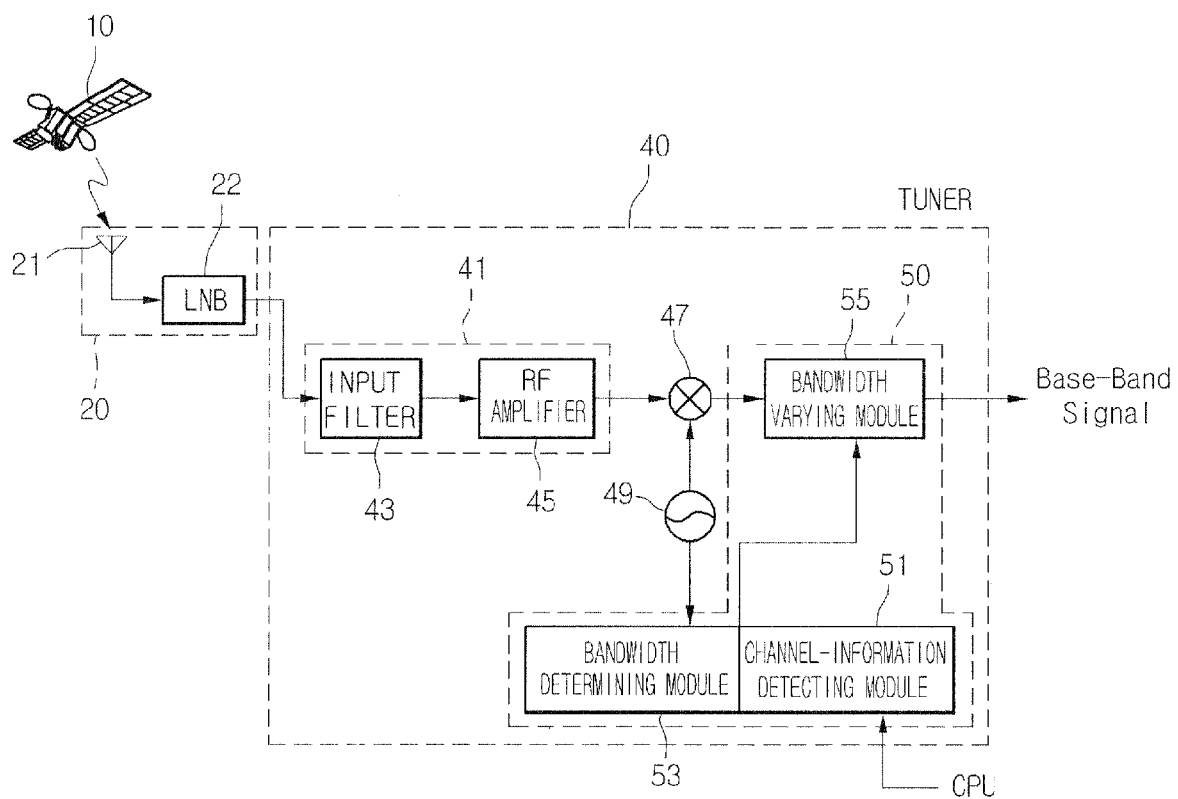

[Fig. 3]
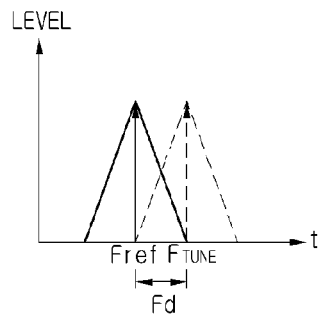
[Fig. 4]
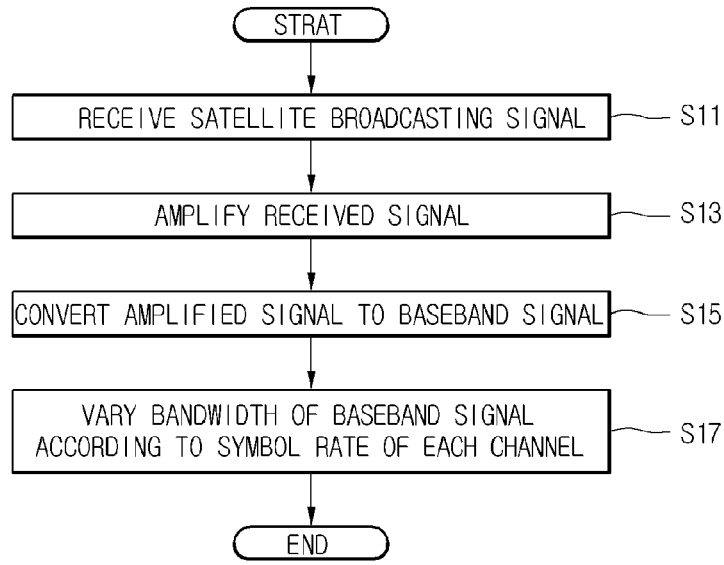
[Fig. 5]
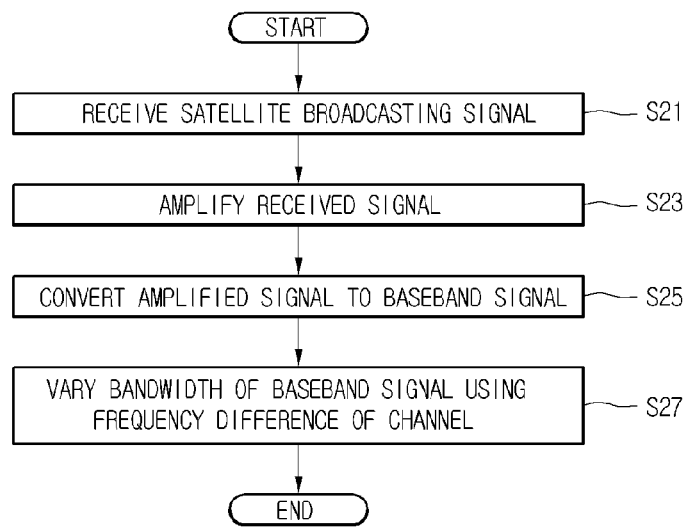

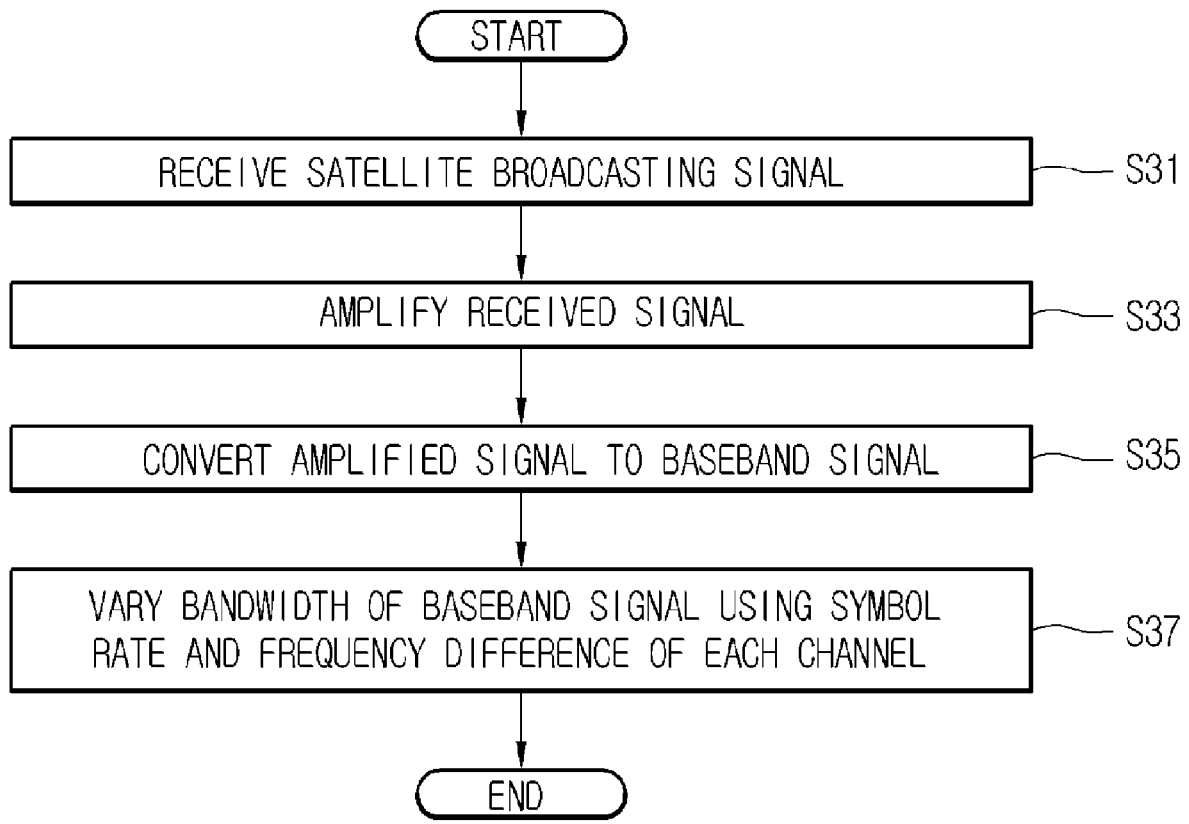

APPARATUS FOR RECEIVING SATELLITE BROADCASTING AND METHOD THEREOF

CROSS-REFERENCE TO RELATED APPLICATION

This application is the U.S. national stage application of International Patent Application No. PCT/KR2006/003205, filed Aug. 16, 2006, the disclosure of which is hereby incorporated by reference in its entirety.

TECHNICAL FIELD

The present invention relates to an apparatus and method for receiving satellite broadcasting.

BACKGROUND ART

The demand for digital broadcasting reception and very high-speed multimedia services using a satellite is sharply increasing in the current mobile environment. In response to the increasing demand, many satellites are being launched.

For the direct satellite broadcasting, video data, audio data and/or data for broadcasting are compressed according to proper digital compression standards, and such data are encoded and multiplexed. The multiplexed data are modulated by a proper modulating method, and are transmitted via an RF carrier signal. The satellite broadcasting is transmitted generally within a Ku-bandwidth, a C-band, or a KA-band, and an antenna for receiving satellite broadcasting is installed outdoors to receive a transmitted signal. Also, a relay called a gap filler is installed in a poor reception area such as an underground or a tunnel to allow uninterrupted reception of a satellite broadcasting signal.

A signal received by the antenna for receiving the satellite broadcasting is modulated to an intermediate frequency by a low noise block (LNB). The LNB may be installed together with the antenna or separately from the antenna. Thereafter, the received signal is outputted through a set-top box installed indoors.

DISCLOSURE OF INVENTION

Technical Problem

However, interference caused by an influence of an adjacent channel or a signal in a similar frequency band may occur in a receiver that receives the satellite broadcasting. A trap filter that performs tracking on the adjacent channel is separately installed to prevent the interference of the adjacent channel. However, the trap filter causes the number of components and a manufacturing cost to increase.

Technical Solution

The present invention provides an apparatus and method for receiving satellite broadcasting capable of varying a channel bandwidth in receiving a satellite broadcasting signal.

An apparatus for receiving satellite broadcasting comprises: an RF input unit amplifying an inputted satellite broadcasting signal; a mixer converting an output signal of the RF input unit into a baseband signal; and a bandwidth controller varying a channel bandwidth of the baseband signal according to a symbol rate of a selected channel.

An apparatus for receiving satellite broadcasting comprises: an RF input unit amplifying an inputted satellite broadcasting signal; a local oscillator outputting a center frequency of a selected channel; a mixer converting an output signal of the RF input unit into a baseband signal by mixing the output signal with the center frequency of the local oscillator; and a bandwidth controller varying a bandwidth of each channel using a symbol rate and center frequency information of the selected channel.

A method for receiving satellite broadcasting comprises: amplifying an inputted satellite broadcasting signal; converting the amplified signal to a baseband signal by mixing the amplified signal with a center frequency of a selected channel; and varying a channel bandwidth of the baseband signal.

ADVANTAGEOUS EFFECTS

According to an apparatus for receiving satellite broadcasting according to embodiments of the present invention, a bandwidth is assigned in proportion to a symbol rate of each channel, so that each channel can have an optimum bandwidth.

Also, since a frequency interval between adjacent channels is maintained, a noise caused by an influence of an adjacent channel may be reduced.

In addition, an accurate selection of a channel can be performed by taking the amount of channel frequency drifts occurring in a receiver into account.

BRIEF DESCRIPTION OF THE DRAWINGS

FIG. 1 is a schematic block diagram of an apparatus for receiving satellite broadcasting according to the present invention;

FIG. 2 is a detailed block diagram of an antenna unit and a tuner of FIG. 1;

FIG. 3 is a graph showing drift amounts of a channel center frequency according to an embodiment of the present invention;

FIG. 4 is a flow chart of a method for receiving satellite broadcasting according to a first embodiment of the present invention;

FIG. 5 is a flow chart of a method for receiving satellite broadcasting according to a second embodiment of the present invention; and FIG. 6 is a flow chart of a method for receiving satellite broadcasting according to a third embodiment of the present invention.

MODE FOR THE INVENTION

An apparatus for receiving satellite broadcasting according to the present invention will now be described in detail with reference to accompanying drawings.

FIG. 1 is a schematic block diagram of an apparatus for receiving satellite broadcasting according to the present invention, and FIG. 2 is a detailed block diagram of FIG. 1.

As illustrated in FIGS. 1 and 2, the apparatus for receiving satellite broadcasting includes an antenna unit 20 and a set top box 30 connected thereto.

The antenna unit 20 includes an antenna 21 and a low noise block (LNB) 22, and the antenna 21 is an antenna for receiving satellite broadcasting to receive a digital broadcasting signal from a satellite. The LNB 22 down-converts the received digital broadcasting signal to an intermediate frequency.

The antenna unit 20 receives 4~8 GHz (C-band) or 12.5 GHz-18 GHz (Ku-band) that is most commonly used. An antenna unit that is able to receive even a Ka-band is being developed.

The set top box 30 includes a tuner 40, and the tuner 40 is connected to the antenna unit 20 via a cable. The set top box receives a digital broadcasting signal, such as a compressed image or audio data broadcasted from the satellite through the tuner 40, separates a plurality of contents, and converts the signals containing the plurality of contents so that a user can view only compressed contents desired by the user using a display device.

The tuner amplifies a signal received from the antenna unit 20 or removes noises therefrom so as to output signals of a channel desired by the viewer. The tuner may vary a bandwidth of each channel using a symbol rate of each channel and/or the shift amount of a channel frequency.

As illustrated in FIG. 2, the tuner 40 includes an RF input unit 41, a mixer 47, a local oscillator 49, and a bandwidth controller 50.

The RF input unit 41 includes an input filter 43 and an RF amplifier 45. The input filter 43 removes noises of a digital broadcasting signal outputted from the LNB 22, and the RF amplifier 45 amplifies the noise-removed signal to a predetermined size.

The mixer 47 mixes the signal amplified by the RF amplifier 45 with a center frequency from the local oscillator 49, and thus outputs a baseband signal. The local oscillator 49 searches for a center frequency of a selected channel, and then outputs the center frequency to the mixer 47.

The bandwidth controller 50 includes a channel information detecting module 51, a bandwidth determining module 53, and a bandwidth varying module 55. The bandwidth controller 50 varies a bandwidth of a channel of the base band signal outputted from the mixer 47. Factors for varying the channel bandwidth include a symbol rate of each channel, and a frequency difference of a channel.

The channel information detecting module 51 detects information on channel to be selected from a central processing unit (CPU). The channel information includes a symbol rate (SR) of each channel, a reference center frequency of a channel, or the like.

The bandwidth determining module 53 determines an optimum bandwidth using the center frequency information of the channel inputted from the local oscillator, and channel information inputted from the channel information detecting module 51, and outputs a bandwidth control signal.

The bandwidth determining module 53 determines the optimum bandwidth of the channel, selectively using the symbol rate of the channel and the frequency information of the channel, and outputs the bandwidth control signal to the bandwidth varying module 55.

The bandwidth varying module 55 varies the channel bandwidth of the baseband signal outputted from the mixer 49 in response to the bandwidth control signal of the bandwidth determining module 53.

The bandwidth determining module 53 may determine the bandwidth (BW) using the following equation 1.

$$BW = (1+\alpha) \times (SR/\log 2M) \quad \text{(equation 1)}$$

where '$\alpha$' represents a roll off factor or a protection band which is prescribed by a predetermined standard (e.g., in the case of a DVB-S (digital video broadcast over satellite), the roll off factor is 0.35), 'SR' represents a fixed symbol rate for each channel, and 'M' represents a degree of modulation (e.g., in the case of the DVB-S broadcasting, QPSK is employed as a modulation type, and the degree of modulation is 2). Here, the roll off factor, the symbol rate, and the degree of modulation used in the equation 1 may be changed depending on standards or types being used.

The bandwidth determining module 53 may vary the channel bandwidth according to the symbol rate of each channel as expressed in the equation 1, or may correct the channel bandwidth using the shift amount of the frequency.

Also, the bandwidth determining module 53 may vary the bandwidth using the following equation 2.

$$BW = (1+\alpha) \times (SR/\log 2M) + F_{RECEIVER} \quad \text{(equation 2)}$$

where $F_{RECEIVER}$ representing the drift amount of a channel frequency occurring in a satellite broadcasting receiver is a factor for frequency-correction serving to correct the channel bandwidth with regard to center-frequency drifts of the channel, which occur as the LNB 22 and the antenna unit 20 and tuner 40 are affected by the external environment, weather changes, component characteristics, and the like.

The frequency-correction factor may be calculated by the following equation 3.

$$F_{RECEIVER} = F_{LNB\ DRIFT} + F_{SHIFT} \quad \text{(equation 3)}$$

where the $F_{LNB\ DRIFT}$ is a frequency that drifts in the LNB of the antenna unit because of the quality of the LNB, the weather changes or the like, and the $F_{SHIFT}$ represents the shift amount of the channel frequency from a transmission terminal to a tuner input terminal.

The shift amount of the channel frequency in the LNB 22 of the antenna unit 20, and the shift amount of the channel frequency from the transmission terminal to the tuner input terminal may be calculated by the following equation 4. Through the equation 4, the frequency-correction factor may be calculated.

$$F_{RECEIVER} = |F_{REF} - F_{TUNE}| \quad \text{(equation 4)}$$

where the $F_{REF}$ represents a reference center frequency of the channel, and the $F_{TUNE}$ represents an actual tuning center-frequency of the channel from the local oscillator, and may vary depending on a reception environment.

As illustrated in FIG. 3, in a process of searching for the center frequency of the channel, a channel is selected at an initial stage, and the local oscillator operates to output the reference center frequency ($F_{REF}$) of the channel. When tuning by the reference center frequency ($F_{REF}$) fails or the level is smaller than a threshold value, scanning is performed by moving the reference center frequency ($F_{REF}$) to the right and left, and the center frequency ($F_{TUNE}$) of the channel for the actual tuning is searched for.

Thus, a difference occurs between the reference center frequency ($F_{REF}$) of the channel and the center frequency ($F_{TUNE}$) of the channel. This frequency difference corresponds to the drift amount (Fd) of a center frequency of the channel occurring at the satellite broadcasting receiver, namely, a correction frequency. The channel bandwidth may be corrected using the correction frequency factor reflecting the shift amount of the channel frequency in the LNB of the antenna unit and the tuner.

In the present invention, the channel bandwidth may be varied using the symbol rate as expressed in the equation 1, or using the center frequency difference as expressed in the equation 2.

FIG. 4 is a flow chart of a method for receiving satellite broadcasting according to the first embodiment of the present invention.

Referring to FIG. 4, when a satellite broadcasting signal outputted from the antenna unit is received to the tuner (S11), The RF input unit amplifies the received signal (S13), and the mixer converts the amplified RF signal to a baseband signal and outputs the baseband signal (S15).

The bandwidth controller varies a bandwidth of the base band signal according to a symbol rate of each channel (S17). That is, the bandwidth controller varies the channel bandwidth of the baseband signal to a bandwidth corresponding to a symbol rate of the corresponding channel, such that the channel bandwidth may be expanded in the case of large data amounts or reduced in the case of small data amounts.

FIG. 5 is a flow chart of a method for receiving satellite broadcasting according to the second embodiment of the present invention.

Referring to FIG. 5, when a satellite broadcasting signal is received to the tuner through the antenna unit (S21), the RF input unit amplifies the received signal (S23), and the mixer converts the amplified RF signal to a baseband signal and outputs the baseband signal (S25).

The bandwidth controller varies a bandwidth of the baseband signal using a difference between a reference center frequency of the channel and an actually-tuned center frequency of the local oscillator (S27). That is, correction of the channel bandwidth may be performed according to the shift amount of the channel frequency.

FIG. 6 is a flow chart of a method for receiving satellite broadcasting according to the third embodiment of the present invention.

Referring to FIG. 6, when a satellite broadcasting signal is received to the tuner through the antenna unit (S31), the RF input unit amplifies the received signal (S33), and the mixer converts the amplified signal to a baseband signal (S35).

The bandwidth controller varies the bandwidth using a symbol rate of each channel and a frequency difference (S37). Thus, the bandwidth of the channel may be varied according to the symbol rate of each channel, and the difference between the channel reference center frequency and the channel center frequency in the actual tuning.

As described so far, according to the apparatus and method for receiving satellite broadcasting, a bandwidth of a channel may be varied when a satellite broadcasting signal is received.

INDUSTRIAL APPLICABILITY

In an apparatus and method for receiving satellite broadcasting according to embodiments of the present invention, a bandwidth is assigned in proportion to a symbol rate of each channel, so that each channel can have an optimum bandwidth.

Also, since a frequency interval between adjacent channels is maintained, a noise caused by an influence of an adjacent channel may be reduced.

In addition, an accurate selection of a channel can be performed as the amount of channel frequency drifts occurring in a receiver is taken into account.

The invention claimed is:

1. An apparatus for receiving satellite broadcasting, comprising:
   a radio frequency (RF) input unit for amplifying an inputted satellite broadcasting signal;
   a local oscillator for outputting a center frequency of a selected channel;
   a mixer for converting an output signal of the RF input unit into a baseband signal by mixing the output signal with the center frequency of the local oscillator; and
   a bandwidth controller for varying a bandwidth of each channel using a bandwidth (BW) obtained using the following equation:

$$BW=(1+\alpha)\times SR/\log_2 M + F_{Receiver},$$

where $\alpha$ represents a roll off factor, SR represents a symbol rate, M represents a degree of modulation, and $F_{Receiver}$ represents a drift amount of a channel frequency.

2. The apparatus according to claim 1, wherein the bandwidth controller comprises:
   a channel information detecting module for detecting a symbol rate and a reference center frequency of the selected channel;
   a bandwidth determining module for determining the bandwidth using the equation; and
   a bandwidth varying module for varying a channel bandwidth of the baseband signal to a bandwidth determined by the bandwidth determining module.

3. The apparatus according to claim 1, wherein the drift amount of the channel frequency is a difference between the reference center frequency of the channel and an actually-tuned center frequency.

4. The apparatus according to claim 1, wherein the inputted satellite broadcasting signal is provided by an antenna unit, wherein the antenna unit comprises:
   an antenna for receiving a C band or a Ku band from a satellite; and
   a low noise block (LNB) for down-converting a signal received by the antenna to an intermediate frequency, and outputting the down-converted signal to the RF input unit.

5. A method for receiving satellite broadcasting, the method comprising:
   amplifying an inputted satellite broadcasting signal;
   converting the amplified signal to a baseband signal by mixing the amplified signal with a center frequency of a selected channel; and
   varying a channel bandwidth of a selected channel using the following equation:

$$BW=(1+\alpha)\times SR/\log_2 M + F_{Receiver},$$

where $\alpha$ represents a roll off factor, SR represents a symbol rate, M represents a degree of modulation, and $F_{Receiver}$ represents a drift amount of a channel frequency.

6. The method according to claim 5, further comprising converting the inputted satellite broadcasting signal into an intermediate frequency by a low noise block (LNB) of an antenna unit before amplifying the inputted satellite broadcasting signal.

* * * * *